(No Model.)
M. C. LEFFERTS & W. B. CARPENTER.
Celluloid Doll.
No. 237,559.          Patented Feb. 8, 1881.
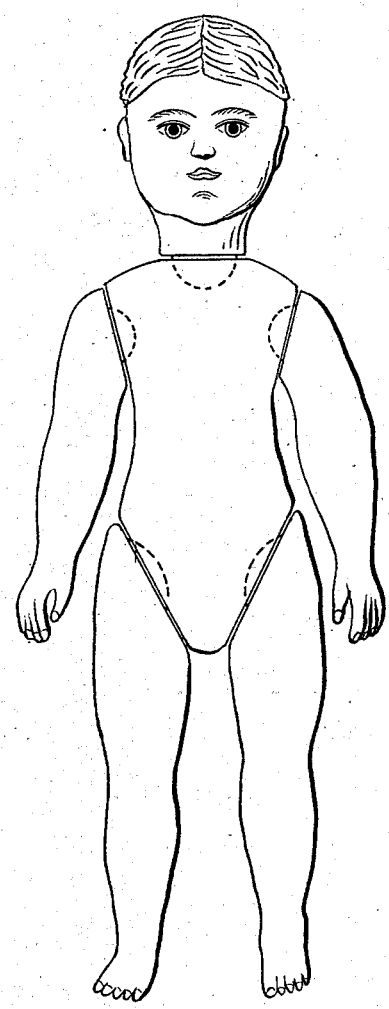
Attest:
George B Adams
Joseph M Eno
Inventor.
Marshall C. Lefferts
William B. Carpenter
By Horace Harris atty

United States Patent Office.

MARSHALL C. LEFFERTS, OF NEW YORK, N. Y., AND WILLIAM B. CARPENTER, OF NEWARK, N. J., ASSIGNORS TO CELLULOID MANUFACTURING COMPANY, OF NEW YORK, N. Y.

CELLULOID DOLL.

SPECIFICATION forming part of Letters Patent No. 237,559, dated February 8, 1881.

Application filed January 7, 1881. (No model.)

*To all whom it may concern:*

Be it known that we, MARSHALL C. LEFFERTS, of New York city, county, and State, and WILLIAM B. CARPENTER, of Newark, in the county of Essex and State of New Jersey, have invented a new and useful Improvement in Celluloid Dolls, of which the following is a specification.

Our invention relates to the manufacture of dolls, either in whole or in part, from celluloid, or other compound of pyroxyline, wherein the whole structure is made of this material, or some part thereof, as that the outer surface may be of celluloid and the inner or an interlining of some other material.

The figure is of a whole doll articulated at various points.

In our manufacture of dolls or dolls' heads, we take the pyroxyline in any suitable form for molding into the desired shape, which may be done by any process that will put the material into the form required, so that the celluloid shall appear on the outer surface. This may be done by molding the dolls in sections, and then putting the parts together, making a whole; or by molding them from tubes by a process of pressing into complete form by devices and mechanism for which a patent was allowed July 26, 1880, to one of the present applicants, (Carpenter,) or by some other process accomplishing the same purpose.

The figure shows a complete form articulated, making a flexible doll; or we may make but a head, or head and breast in a fixed order to receive such additions as taste may dictate.

The dolls, when molded, will be finished by any suitable means, but preferably by a process set forth in the patent to the within-named Wm. B. Carpenter, No. 235,933, December 28, 1880.

We claim—

1. A head or other part of a doll made wholly or in part of celluloid or other compound of pyroxyline.

2. A doll consisting wholly or in part of celluloid or other compound of pyroxyline.

3. A head or other parts of a doll the surface of which is coated with celluloid or other compound of pyroxyline.

4. The doll or part of a doll made of material substantially as described, and molded into form in separate sections, substantially as set forth.

5. The doll or parts of a doll made of materials substantially as described, and molded whole, substantially as and for the purpose specified.

MARSHALL C. LEFFERTS.
WILLIAM B. CARPENTER.

Witnesses:
HORACE HARRIS,
GEORGE B. ADAMS.